June 14, 1955　　　S. A. COGSDILL　　　2,710,549
MICRO-LIMIT COUNTERSINK DRIVER
Filed Jan. 31, 1952
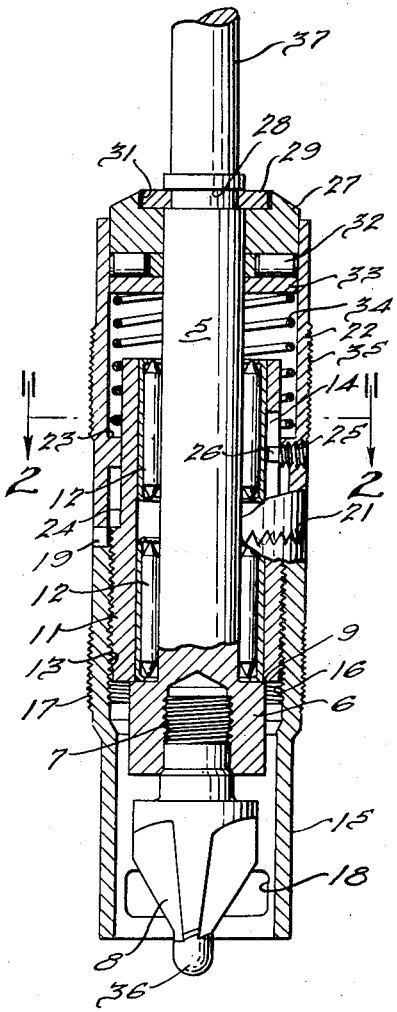
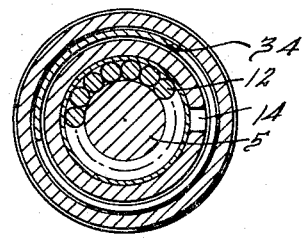
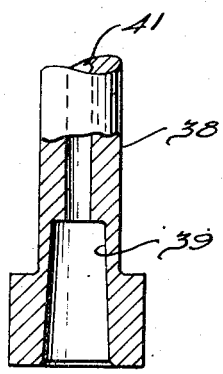
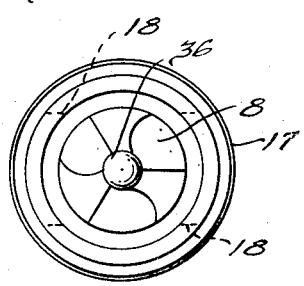
INVENTOR.
Stuart A. Cogsdill,
BY
Harness, Dickey & Pierce
ATTORNEYS.

2,710,549

MICRO-LIMIT COUNTERSINK DRIVER

Stuart A. Cogsdill, Detroit, Mich., assignor to Cogsdill Twist Drill Company, Inc., Detroit, Mich., a corporation of Michigan Application January 31, 1952, Serial No. 269,273

5 Claims. (Cl. 77—73.5)

This invention relates to micro-limit countersink drives, and particularly to a drive for a countersinking tool which limits the depth to which the countersink may be driven.

Various types of drives for countersink tools having limit means thereon have been provided heretofore in the art.

The present limiting drive means on the countersink tool provides accurate adjustment for depth while eliminating friction between the limiting sleeve and the driving spindle. Needle bearings are provided between the spindle and body, and the body has a fine thread on the outer surface and an axially disposed slot in which a dog point in an adjusting sleeve projects to cause the sleeve and body to rotate together and to be relatively movable longitudinally. A stop collar has an internal thread engaged with the thread on the body, and thin serrations on the upper end of the collar and the lower end of the adjusting sleeve prevent the stop collar from rotating relative to the body. By moving the adjusting sleeve longitudinally, the serrations are disengaged and the rotation of the sleeve or collar on the body adjusts the collar on the threads thereof, to thereby accurately locate the end of the sleeve relative to the countersink tool which is secured on the end of the spindle. A spring is provided for urging the adjusting sleeve downwardly to retain the serrations in locked position after adjustment.

Accordingly, the main objects of the invention are: to provide a limiting countersink drive which embodies a spindle which has bearing relation with a body which is provided with external threads on which a stop collar may be adjusted; to provide an axially movable sleeve with serrations engaging serrations on the stop collar for locking the stop collar against rotation on the body; to provide a screw threaded into the adjusting sleeve with a dog point which extends into a vertical slot in the body to cause the body to rotate with the sleeve and to permit the sleeve to be moved longitudinally to disengage the serrations; and, in general, to provide a limiting countersink device which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

Figure 1 is a vertical sectional view of a limiting countersink drive embodying features of the present invention;

Fig. 2 is a sectional view of the structure illustrated in Fig. 1, taken on the line 2—2 thereof;

Fig. 3 is a bottom end view of the driving device illustrated in Fig. 1, and

Fig. 4 is a broken view of the driving spindle illustrated in Fig. 1, showing a further form thereof.

The micro-limit countersink device of the present invention embodies a spindle 5 having an enlarged head 6 at one end which has a central threaded aperture 7 for receiving the threaded end of a countersink tool 8. A shoulder 9 formed by the head 6 engages the end of a tubular body 11 through which the spindle 5 extends. A pair of needle bearings 12 is disposed within the inner cylindrical wall of the body 11 and the outer surface of the spindle 5 to permit the rotation of the spindle within the body. The body is provided with a fine thread 13 on its lower outer surface and an axially disposed slot 14 through its upper wall. A stop collar 15 of tubular shape is provided with an internal thread 16 which engages the thread 13 of the body 11. The outer surface of the stop collar 15 may be roughened as if by knurling, as illustrated at 17. A plurality of slots 18 is provided through the wall of the stop collar near the bottom thereof through which the hole to be countersunk may be viewed.

The upper end of the stop collar is provided with a plurality of uniform serrations 19 which mate with similar serrations 21 in an adjusting sleeve 22 which is mounted about the upper portion of the body 11. An inwardly directed flange 23 guides the sleeve on the upper body portion 24. A screw 25 in the sleeve 22 has a dog point 26 projecting within the slot 14 in the body 11. A thrust plate 27 is disposed about the upper end of the spindle 5 in position to project within the upper end of the adjusting sleeve 22 which is guided thereon. A slot 28 is provided in the spindle for receiving a C-shaped locking ring 29 which is locked in position when disposed within a recess 31 in the upper portion of the thrust plate 27. A thrust bearing of any type, herein illustrated as a roller bearing 32, is disposed beneath the thrust plate 27 and a spring retaining washer 33 is mounted beneath the thrust bearing 32. A spring 34 is positioned between the spring retaining washer 33 and the inwardly projecting flange 23 of the adjusting sleeve 22 for retaining the serrations 19 and 21 in engagement. The adjusting sleeve is movable longitudinally of the spindle, limited by the length of the slot 14 in which the dog point 26 is vertically movable.

When the adjusting sleeve 22 is moved vertically, the serrations 19 and 21 are disengaged, permitting the adjusting sleeve to rotate the body 11 or the stop collar to be rotated thereon for adjusting the collar on the body. Serrations 35 are provided on the outer surface of the adjusting sleeve 22 so that the sleeve 22 and the stop collar 15 may be firmly grasped and rotated relative to each other. In other words, when the adjusting sleeve 22 is moved vertically to disengage the serrations 19 and 21, either the sleeve or the stop collar may then be rotated to produce the adjustment of the stop collar relative to the body 11 to thereby regulate the amount of movement of the countersink tool relative to the bottom face of the stop collar.

The stop collar rests upon the work after the pilot end 36 of the countersink is inserted in the aperture which is to be countersunk, and the downward movement of the spindle as it rotates produces the countersinking operation. The depth of the countersink is limited by the movement of the spring retaining washer 33 downwardly until it strikes the top of the body 11. By adjusting the stop collar on the body, the depth of cut produced by the countersink tool is thereby accurately gauged. The use of the closely disposed serrations 19 and 21 permits very accurate adjustment of the stop collar relative to the body on the fine threads 13 thereof, permitting a minute change in the adjustment of the collar relative to the body, which thereby very accurately controls the depth of the countersink produced by the tool. The driving end 37 of the spindle 5 may take any form depending upon the drive means employed for supporting and rotating the spindle.

In Fig. 4, a spindle 38 is illustrated, having a tapered aperture 39 in the end for receiving a tapered shank on the countersink tool 8 when such type of shank is provided on the tool. A knock-out aperture 41 is provided through the spindle so that the tool may be readily removed from the aperture 39 when removal is desired.

What is claimed is:

1. A limiting countersink drive including, in combination, a cylindrical spindle having an enlarged tool engaging head at one end and an annular slot near the drive end, a tubular body extending over said spindle in abutting relation with said head having a fine thread on its outer surface and an axially disposed slot through its wall, bearing means disposed between said body and spindle, an adjusting sleeve disposed over said spindle and body having fine serrations at its lower end, a stop collar having an internal thread mated with the thread on the body, serrations on the upper end of the stop collar engageable with the serrations on said adjusting sleeve, a setscrew in said adjusting sleeve having a dog point projecting into the slot in the body for permitting relative longitudinal movement therewith and preventing relative rotation therebetween, a thrust collar on said spindle, and a spring between said thrust collar and said adjusting sleeve for urging the sleeve downwardly for maintaining the serrations in engaged adjusted position and for retracting said spindle.

2. A limiting countersink drive including, in combination, a cylindrical spindle having an enlarged tool engaging head at one end and an annular slot near the drive end, a tubular body extending over said spindle in abutting relation with said head having a fine thread on its outer surface and an axially disposed slot through its wall, bearing means disposed between said body and spindle, an adjusting sleeve disposed over said spindle and body having fine serrations at its lower end, a stop collar having an internal thread mated with the thread on the body, serrations on the upper end of the stop collar engageable with the serrations on said adjusting sleeve, a setscrew in said adjusting sleeve having a dog point projecting into the slot in the body for permitting relative longitudinal movement therewith and preventing relative rotation therebetween, a thrust collar on said spindle, a thrust bearing beneath said thrust collar, a spring retaining washer beneath said thrust bearing, an inwardly directed flange in said adjusting sleeve, and a spring between said spring retaining washer and the flange on said adjusting sleeve for urging said adjusting sleeve downwardly to retain said serrations in engaged adjusted position and for retracting said spindle.

3. A limiting countersink drive including, in combination, a cylindrical spindle having an enlarged tool engaging head at one end and an annular slot near the drive end, a tubular body extending over said spindle in abutting relation with said head having a fine thread on its outer surface and an axially disposed slot through its wall, bearing means disposed between said body and spindle, an adjusting sleeve disposed over said spindle and body having fine serrations at its lower end, a stop collar having an internal thread mated with the thread on the body, serrations on the upper end of the stop collar engageable with the serrations in said adjusting sleeve, a setscrew in said adjusting sleeve having a dog point projecting into the slot in the body for permitting relative longitudinal movement therewith and preventing relative rotation therebetween, stop means on said spindle near the upper end thereof spaced from said body for limiting the downward movement of said spindle relative to the body, and a spring engaging said stop means and said adjusting sleeve for urging said adjusting sleeve downwardly for maintaining said serrations in engaged adjusted position and for retracting said spindle.

4. A limiting countersink drive including, in combination, a body, a spindle in said body having an enlarged head on its bottom end engageable with said body, stop means on the upper end of the spindle spaced from said body for controlling the degree of movement between said spindle and body, said body having a fine external thread, a stop collar having an internal thread mated with the thread on the body, a nonrotatable longitudinally movable adjusting sleeve about said body aligned with said stop collar, the abutting ends of the sleeve and collar having mating serrations for locking the collar and sleeve against rotation, and a spring having one end engaging said stop means and the opposite end engaging said sleeve for retracting said spindle and retaining said sleeve in locked relation to said collar.

5. A limiting countersink drive including, in combination, a body, a spindle in said body having an enlarged head on its bottom end engageable with said body, stop means on the upper end of the spindle spaced from said body for controlling the degree of movement between said spindle and body, said body having a fine external thread, a stop collar having an internal thread mated with the thread on the body, an adjusting sleeve about said body aligned with said stop collar, the abutting ends of the sleeve and collar having mating serrations for locking the collar and sleeve against rotation, means interconnecting said body and adjusting sleeve permitting the longitudinal movement of the adjusting sleeve relative to the body while preventing relative rotation therebetween, and a spring engaging said adjusting sleeve and said stop collar for retaining said serrations in engaged adjusted position and for retracting said spindle in said body.

References Cited in the file of this patent

UNITED STATES PATENTS

| 2,308,055 | Cogsdill | Jan. 12, 1943 |
| 2,409,377 | Miller | Oct. 15, 1946 |